United States Patent [19]

Kanai et al.

[11] 3,893,187

[45] July 1, 1975

[54] SCANNING MAGNETIC HEAD

[75] Inventors: Kenji Kanai, Neyagawa; Eisuke Sawai, Katano; Norimoto Nouchi, Hirakata, all of Japan

[73] Assignee: Matsushita Electric Industrial Co., Ltd., Osaka, Japan

[22] Filed: Mar. 13, 1974

[21] Appl. No.: 450,852

[30] Foreign Application Priority Data

| | | |
|---|---|---|
| Mar. 20, 1973 | Japan | 48-31999 |
| Mar. 20, 1973 | Japan | 48-32000 |
| Mar. 20, 1973 | Japan | 48-32001 |
| July 6, 1973 | Japan | 48-76354 |
| July 6, 1973 | Japan | 48-76355 |

[52] U.S. Cl. .................................. 360/115; 360/125

[51] Int. Cl. .......................... G11b 5/12; G11b 5/22

[58] Field of Search ........... 360/115, 110, 119, 120, 360/122, 123, 125

[56] References Cited

UNITED STATES PATENTS

| | | | |
|---|---|---|---|
| 2,955,169 | 12/1960 | Stedtnitz | 360/115 |
| 3,152,225 | 12/1964 | Peters | 360/115 |
| 3,696,216 | 10/1972 | Sugaya | 360/115 |
| 3,845,503 | 10/1974 | Kanai | 360/115 |

*Primary Examiner*—Alfred H. Eddleman
*Attorney, Agent, or Firm*—Wenderoth, Lind & Ponack

[57] ABSTRACT

In a tape head of magnetic scanning type, wherein the magnetic transducing point on the head scans along a transducing gap 4, the head comprises:

a pair of magnetic poles 1, 1' which are set symmetrically with respect to the gap 4, said poles 1, 1' being made of soft-magnetic thin film applied on a non-magnetic substrate of smooth surface, and bridging across each pole of a pair of magnetic yokes 10,10'. When the soft-magnetic thin film is made of vapor-depositions and subsequent photo-etchings, a desired pattern can be made with high precision, and a good performance as well as a high yield in manufacturing is obtainable.

10 Claims, 10 Drawing Figures

SCANNING MAGNETIC HEAD

BACKGROUND OF THE INVENTION

This invention relates to an improvement in a head of magnetic scanning type, wherein the magnetic transducing point on the head scans along a transducing gap. With this head a signal of very wide frequency range, for instance a video signal, can be recorded on the tape or reproduced from the tape which travels in a direction nearly perpendicular to the gap.

Many improvements have been proposed concerning the scanning type magnetic recording head. One invention was proposed in the specification of the U.S. Pat. No. 2,955,169 for W. Stednitz. This prior art proposed:

> a translating head for magnetic recording systems comprising a plurality of magnetic head elements arranged in a row and being spaced apart in said row, a signal coil magnetically coupled to said head units, magnetizing means separate from said signal coil for applying magnetizing forces to the elements in said row, said magnetizing forces being of one polarity at one end of said row and decreasing in value to zero near the middle of said row and then reversing in polarity and increasing in value to the other end of said row, and second magnetizing means separate from said signal coil for applying to the head elements in said row magnetizing forces of uniform value and of the same polarity throughout said row, and means for varying the value of said second magnetizing forces.

Said head of Stednitz has shortcomings that assembling of the head is very troublesome because a plurality of, say, more than several hundreds of magnetic head elements made of thin magnetic material must be stacked in a row, and also that each of the magnetic elements receives considerable interference from the neighboring magnetic elements because the magnetic elements are piled one another over a considerable area causing a considerable magnetic reluctance inbetween. The former shortcoming causes high manufacturing cost, while the latter shortcoming deteriorates discrimination between the recordable point and the remaining part of the recording gap, and hence deteriorates the high frequency characteristic.

Another invention was proposed in the specification of the U.S. Pat. No. 3,152,225 for C. J. Peters. This prior art proposed as follows as seen, for instance, in its claim 20:

> In magnetic tape transducing apparatus including means for transporting the tape in the direction of its longitudinal axis, a transducer comprising an elongated member formed of magnetic permeable material having a substantially square magnetization characteristic, means coupled to said member for producing opposing magnetic fields within said member of an intensity to saturate the material of said member everywhere except in a region around a line where the fields cancel, said region shifting along the member transversely of the tape as the intensities of said opposing fields are differentially varied, the permeability of said region being sufficiently higher than the rest of said member that only that elemental portion of the length of siad pole piece opposite said region is in effective magnetic linkage with said tape, a magnetic circuit including an elongated probe formed of magnetic permeable material closely spaced from said member and therewith defining a recording gap through which said tape is transported, and means coupled to said magnetic circuit for providing across said gap, throughout the range of movement of said region, a magnetic field modulated in accordance with a signal to be recorded.

Said head of Peters has shortcomings that the elongated member, of a recording pole, comprises neither comb-like slits nor anisotropic character, and therefore, size of the "region where the fields cancel," namely, the recording spot, can not be sufficiently small, resulting in poor high frequency characteristic, and that the tape must be transported through a delicate narrow gap under the knife-edge of the elongated member, and therefore, mounting the tape in the head will be difficult, and moreover, the tape is likely to be cut.

The same applicant's senior application Ser. No. 312.213 filed on Dec. 4, 1972, now U.S. Pat. No. 3,845,503, proposed an improved head, whose pole pieces having a recording gap inbetween are made of anisotropic soft magnetic thin plates or layers, wherein the direction of greater premeability is arranged to have right angle with the direction of the recording gap, in order to attain a smaller spot of recording for good high frequency performance.

The present invention is an improvement capable of providing a scanning-type magnetic transducing head of the type similar to that of the present applicant's copending senior application.

SUMMARY OF THE INVENTION

The present invention purports to provide an improved scanning-type magnetic recording head capable of recording the signal of wide band width. This invention further purports to provide an improved method of making a scanning-type magnetic recording head affording high yields.

DETAILED DISCLOSURE OF THE INVENTION

Figure 1:
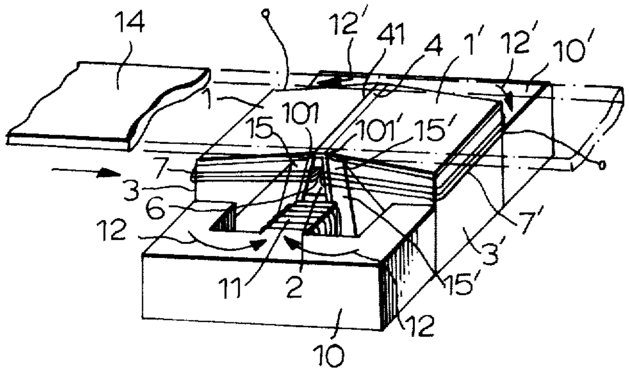
FIG. 1 is a perspective view of the head embodying the present invention.
Figure 4A:
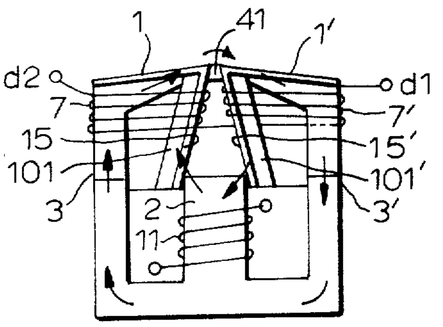
Figure 4B:
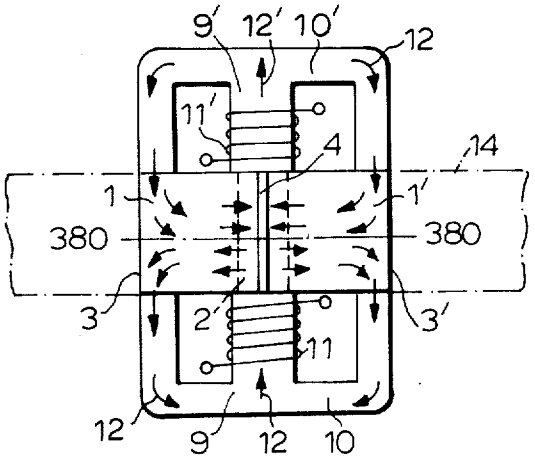

As shown in FIG. 1, the head comprises a pair of top films 1,1' of soft magnetic thin films which are provided so as to be bent down with acute angles such as 60° to 80°, forming an oblique part 101, 101' and magnetically bridge across the top faces of outer poles 3,3' and side-faces of a center core 2. In other words, opposing ends of the top films 1,1' jonin to uppermost ends of oblique thin films 101, 101' at sharp-bent or folded angles, or edge corners, respectively, so that a transducing gap 4 is formed inbetween. The top films 1,1' form a top face of the head for contacting a magnetic recording tape 14 which travels lengthways. The center block or center core 2 is sandwiched between oblique bent-down parts 101, 101' of the top films 1,1'. Singal coils 7, 7' are wound across an outer face of the outer pole 3 and the triangular space 6 defined by the top part 5 of the center core 2 and a pair of the bent-down parts 101, 101' of the top films 1 and 1', and across the outer face of the outer pole 3' and the triangular space 6. And the signal coils 7, and 7' are series-connected with each other as shown in FIG. 4(*a*), so as to generate a signal flux flowing across the gap 4. The oblique bent-down parts 101, 101' of the top films 1, 1' as well as narrow strip part at the gap 4 are formed by vapor deposition or by bonding on substrates 15 and 15' of nonmagnetic heat-resistant substance, respectively.

A pair of E-shape core 10 and 10' are provided in a manner that their center legs contact both end faces of the outer poles 3 and 3', so as to apply magnetic fluxes for scanning the transducing spot, by applying below-mentioned sawteeth currents 12 and 12' to windings 11 and 11', respectively.

Figure 2:
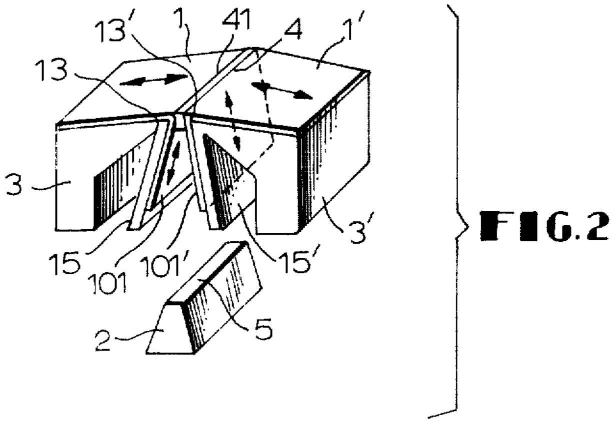
FIG. 2 is a fragmental perspective view of a part of the head shown in FIG. 1.
Figure 3:
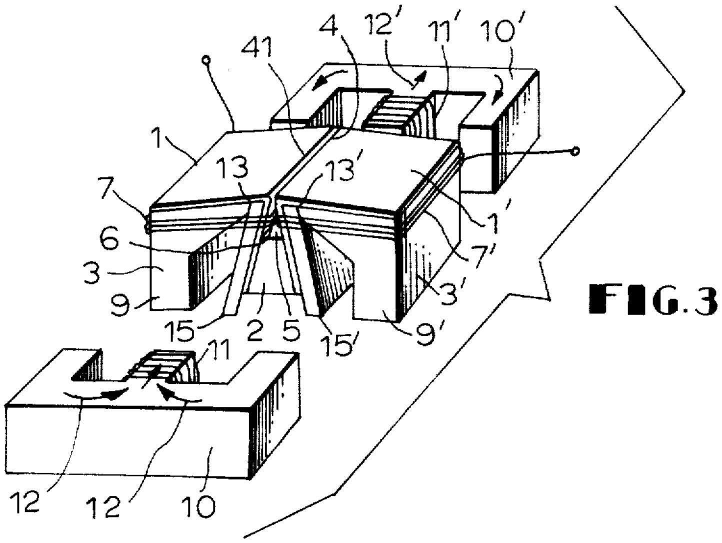
FIG. 3 is a fragmental perspective view of the head shown in FIG. 1, FIG. 4(*a*) is a schematic elevation view of the head with its one E-shape core developed downwards in order to show flows of signal magnetic fluxes, FIG. 4(*b*) is a schematic plan view of the head for illustrating flow of scanning magnetic fluxes.

As can be seen from FIGS. 2, and 3, between the tip 13 of the outer core 3 and the top face 5 of the center core 2, the top thin film 1+101 contacts only the nonmagnetic substrate 15. Also, between the tip 13' of the outer core 3' and the top face 5 of the center core Z, the top thin film 1'+101' contacts only the nonmagnetic substrate 15'. The transducing gap 4 is formed by inserting a gap spacer of a specified thickness 41 between the bent edge parts of the top thin films 1, 1' of soft magnetic material.

In the abovementioned constitution, the materials of the parts are selected as follows:

The anisotropic character of the soft magnetic material of the pole piece 1 and 1' should be that, referring to FIG. 2, the directions of larger permeability shown by the arrows make the right angle to the recording gap 4.

The outer poles 3, 3' should be made of soft magnetic material of sufficiently high permeability in order to effectively pass the magnetic fluxes. A ferrite of soft magnetic high permeability character, for instance, hot-pressed ferrite developed by the applicant, and covered by the applicant's patents, for instance, Japanese Pat. No. 532899 (if necessary, refer to the enclosed article, by Hirosh SUGAYA,IEEE Transactions on magnetics vol. 1. MAG-4, No. 3, Sept. 1968, pp 295–301, is preferable as the material for outer poles 3, 3'. The soft magnetic characteristic is in accordance with general usage herein defined that the coercive force of the material is under 2 Oersted.

The center core 2 should be made of a magnetic substance of comperatively low permeability, for instance, between 10 and 200, and of constant permeability. The constant permeability characteristic is in accordance with general usage herein defined that ratio of Br (residual induction) to Bs (saturation, or saturated induction) is less than 0.3, namely $Br/Bs<0.3$. As such material, so-called dust core, or powdered magnetic material such as carbonyl iron or a Fe-Al-Si alloy which has large saturation Bs, is preferable. The reason to use such material of considerably low premeability and of constant permeability is that the center core 2 is not saturated by the induction given by a pair of E-shape cores 10, 10'. Accordingly, in the direction parallel to the gap 4, a linear distribution of the induction in the center core 2 is obtainable, enabling to impart such linear distribution of the induction to the gap 4 through the oblique bent-down parts 101, 101' of the magnetic thin film.

It is preferable to make the distance between the corner edge part of the thin top film 1 or 1' at the transducing gap part 4 and the top edge of the center core 2 contacting the oblique thin film 101 or 101' to be shorter than the distance between the corner edge part of the thin film 1 or 1' and the upper end tip 13 or 13' of the outer core 3 or 3'. The shorter the former distance is, the more exact the linear distribution of the scanning field intensity along the gap is.

Operation of the abovementioned head is ellucidated referring to FIG. 4(*a*) which is a schematic elevation view with its one E-shape core 10 developed downward for easier representation of signal fluxes, and to FIG. 4(*b*) which is a schematic plan view of the head.

Scanning of the recording point

Reffering to FIG. 4(*b*), when currents of equal quantity are applied to the scanning coils 11 and 11' in such polarities that scanning fluxes in the center legs are of the same direction as shown by arrows 12 and 12', then, magnetizing forces, namely, fractions of the scanning fluxes, pass in the pole pieces 1 and 1'. The magnetizing force induced by the current in the scanning coil 11 and the other magnetizing force induced by the current in the scanning coil 11' are of the opposite direction to each other on the tope films 1 and 1', i.e., the tape-contacting face as shown in FIG. 4(*b*). Thus, the magnetizing force is of one polarity at one end of the recording gap 4 and decreases in value to zero at a point between both ends of said gap 4, and then reverses in polarity and increases in value toward the other end of the gap 4. Namely, the polarity of the fluxes changes at an invisible boundary line 380—380 that passes the point. The boundary line 380—380 crosses the gap 4 at the center of the length of the gap 4 when the currents of both coils 11 and 11' are equal. Scanning magnetic flux produced by the currents of the scanning coils 11 and 11' becomes zero in a very narrow region including the boundary line 380—380, while the region other than said narrow region has a considerable amount of magnetic flux from the scanning electromagnets 7 and 7'. On account of the zero flux in the narrow region, the soft magnetic material of the pole pieces 1 and 1' in this region has permeability not affected by the scanning flux, while the soft magnetic material of the pole pieces 1 and 1' of the region other than the narrow region is saturated by the scanning magnetic flux so that the permeability of the material becomes very low. Therefore, only the small region at the cross point of the gap 4 with the boundary line 380—380 has a considerable permeability.

With the above constitution, the gap 4 of the pole pieces 1 and 1' have the magnetic flux produced by the currents in the signal coils 7 and 7' only at the cross point of the gap 4 with the boundary line 380—380. And the boundary line 380—380 moves upwards or downwards in FIG. 4(*b*) depending on the change of ration between the currents in the scanning coils 11 and 11', and therefore the transducing point where the electro-magnetic transducings of signal are made moves along the length of the gap 4. Accordingly, when the magnetic tape 12 runs on this pole pieces 1 and 1', the transducing point can be scanned on the tape 12.

Signal flux for transducing gap

As shown in FIG. 4(*a*) a signal coil 7 is wound to surround the outer pole piece 3 and the oblique thin film part 101 of the inner pole piece 1 together. Also, another signal coil 7' is wound to surround the outer pole pieces 3' and the oblique thin film part 101 of the pole piece 1'. This manner of winding is advantageous in omitting undesirable by-passing through, hence leaking of signal flux to, the outer poles 3 and 3'. The signal coils 7 and 7' are connected in a manner that, as shown in FIG. 4(*a*), magnetic fluxes produced by signal currents applied to the signal coils 7 and 7' form a main magnetic flux passing the oblique part 101, the transducing gap 4, the oblique part 101', the center core 2, and back to the oblique part 101. Also a dependent magnetic flux passing the parts 3 → 4 → 3' → 10 or 10' → 3 is produced. Both the main and dependent fluxes are effective in the transducing.

Figure 5:
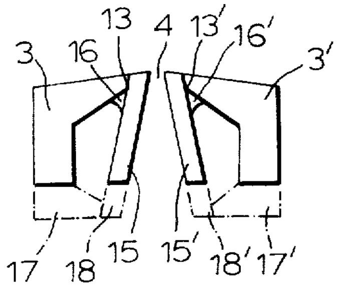
FIG. 5 is an elevation view of semi-fabricated elements of the head showing a step of fabrication, FIGS. 6(*a*) to (*b*) are sectional views of a cast in making semi-fabricated element of another example, FIG. 6(*c*) is a sectional side view of the element showing the lapped plane by the lines 24-24' and 25-25', and FIG. 6(*d*) is a perspective view of the element after coating soft-magnetic thin film thereon.
Figure 6A:
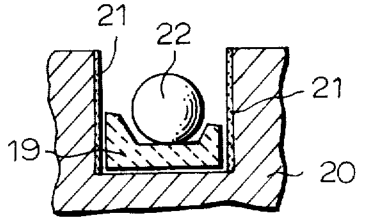
Figure 6B:
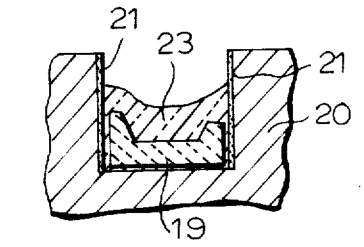
Figure 6C:
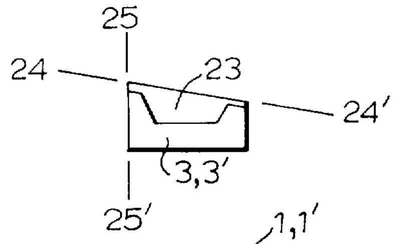
Figure 6D:
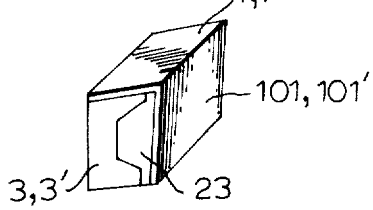

A first example of the present invention is elucidated:

Referring to FIG. 5, the outer poles 3 and 3' and the non-magnetic substrates 15 and 15' are joined at their tip parts 13 and 13', respectively, by a glass bonding agents 16 and 16'. The outer poles 3 and 3' may be U-shaped as shown by the chain lines in the beginning, so as to be bonded with both their end tips to both ends of the substrates 15 and 15', respectively, at first. Then, the lower parts 17, 17' of the outer poles 3 and 3', as well as the lower parts 18, 18' of the substrates 15 and 15' are cut off as shown by the solid lines. The substrates 15, 15' are preferably of heat-resistant smooth ceramic substance such as alumina ($Al_2O_3$), forsterite ($2MgO \cdot SiO_2$), steatite ($MgO \cdot SiO_2$), titanate ($TiO_2$) or barium-titante ($BaTiO_3$), in order to resist high temperature, for instance 400°C, at which temperature the substrates 15, 15' should be kept during- vapor deposition of the thin soft magnetic films 1, 101, 1' and 101'. Alternately the thin soft magnetic films may be bonded to the substrate, but vapor-deposition is better in forming very thin film of fine stripe pattern.

In order to attain best anisotropic characteristic, the thin soft magnetic films have preferably a very fine stripe pattern wherein pitch of the stripes is 20 to 200 $\mu$m.

In order to form thin soft magnetic films of such fine strip pattern, the following steps are preferably took, The semi-fabricated half-element 3+16 shown by solid line in FIG. 5 is coated with the soft magnetic thin film vapor-deposited thereon. The vapor-deposited substance is, for instance permalloy or known Fe-Al-Si alloy. The above-mentioned vapor-deposition is sequentially made from two directions, namely, the directions substantially normal to the faces to be deposited, as indicated by arrows 151 and 102. The vapor-deposition is made while keeping the substrate at a temperature of 200°C to 500°C, to form the thin film 1 and 101 of a thickness between 1 and 10 $\mu$m, preferably between 1 and 5 $\mu$m. By such sequential deposition the thin films 1 and 101 are formed continuous at the corner edge part.

Then, etching masks of stripe-pattern are formed by photochemical process to cover the vapor-deposited soft magnetic thin films. And subsequently, the soft magnetic thin films are etched to make stripe-pattern thin films 1 and 1', with the stripes in the direction shown by arrows in FIG. 2. Then, left half (3+15+1+101) and right half (3'+15'+ 1'+101') are assembled together by sandwiching the gap-spacer 41 and the gap 4 and the center core 2 between oblique parts 15 and 15'. Since the oblique parts 15 and 15' form tapered space defined by planes of the faces 15 and 15', and the side faces of the center core 2 are planes arranged tapered so as to meet the tapered space, the side faces of the center core 2 easily and perfectly contact the inner faces of the tapered space. In the abovementioned photoetching, by utilizing a high precision mask-position-adjustment developed in the manufacture of a large scale integrated circuit (so-called LSI), such a fine adjustment of etched patterns as contacting teeth to teeth of the comb-like thin films 1 and 101 or 1' and 101' is possible on mass production basis. Therefore, fine stripes bent at the corner edges at the gap 4 are obtainable, and sufficiently small transducing spot or region, for instance, several $\mu$m is obtainable.

Then by winding the signal coils 7 and 7', and by contacting the E-shape cores 10 and 10', the head is completed, as shown in FIG. 1, As ellucidated above, the outer poles 3, 3' are made of ferrite, the substrates 15, 15' are made of heat-resistant ceramic or like material, and the substrates 15 and 15' are bonded to the outer poles 3 and 3' with glass 16, 16' as bonding agent, respectively. Accordingly, the semi-fabricated elements are heat-resistant and thermally stable as a whole, and firmly vapor-deposited with permalloy at the raised temperature of about 400°C.

It is specially recommended that thermal expansion coefficient of the vapor-deposited soft magnetic material should be close to or coincide with those of the substrates 15 and 15 or outer poles 3, 3', in order to attain stable magnetic core of long life.

Also, it was empirically found that the smoothness of the surfaces of the substrates 15, 15 and the outer pole 3,3', to which surfaces the soft magnetic thin films were vapor-deposited, was in important factor to obtain a small coercive force and good square-characteristic of the vapor-deposited thin film. In view of the empirical finding, such material as non-magnetic hot-pressed zinc ferrite which was developed by the same applicant is preferable.

A second example of the present invention is elucidated referring to FIGS. 6(*a*) to (*d*) which show steps of making the semi-fabricated half-elements of the head. As shown in FIG. 6(*a*), an outer pole 3 is placed at the bottom of a cast 20, and a lump of glass 22 is placed on the outer pole 3. Numerals 21, 21 designate mica sheets used as decasting and cushion sheets. Then the case is placed in a furnace and is heated above the melting point of the glass, so that the fused glass 23 is coated on the core 3 as shown in FIG. 6(*b*). The melting point should be above the temperature necessary for subsequent vapor-deposition of the soft magnetic films 1 and 101. Then, the element is lapped to obtain a precision planes shown by a line 24-24' and by another line 25-25'. The lapped glass face is very smooth and heat-resistant against a temperature of above 500°C. Then sequential vapor-depositions of the abovementioned soft-magnetic thin films are made onto the necessary faces as shown in FIG. 6(*d*), while keeping the element at a temperature of 400°C.

Then the deposited thin films are etched through etching masks provided by a known photochemical process, so as to obtain fine stripe pattern. And then, the half elements are assembled to form a head, in a manner similar to that of the preceding example.

The vapor-deposited thin magnetic films of the example are supported by oblique surface of the compact glass body 23 rigidly cast on the outer pole 3, and therefore, the magnetic films are free from strain of the substrate.

The application of the head of the present invention is not limited to the magnetic recording tape, but is also applicable to magnetic discs or magnetic drums. In such applications, conventional mechanical shift of the head for track-selection can be substituted by fixings at various preset values of the scanning currents in the scanning coils 11 and 11'.

What is claimed is:

1. A magnetic head comprising:

a pair of pole pieces (1+101, 1'+101') made with soft magnetic thin films, each pole piece of said air having a folded sheet comprising a top plane part (1, 1') for contacting a magnetic tape and an oblique plane part (101, 101'), both the top plane and the oblique plane being connected at an edge corner and having an acute angle inbetween, said pair of pole pieces are so arranged that edge corners of both the pole pieces oppose each other defining a gap inbetween, a center core (2) of a constant-permeability magnetic material sandwiched between a pair of end parts of said oblique plane parts 101 and 101', the center core being extended across the width of the pole pieces in the direction parallel to said gap, a pair of outer poles or second poles (3,3') of magnetic material contacting the rear faces of the top plane parts (1,1'), respectively, a pair of E-shape electromagnets (10, 10'), each of the pair comprizing a winding (11, 11') for accepting sawteeth current, the electromagnets (10, 10') being arranged in a manner that their center legs couple with both end faces of the center core (2) and their outer legs couple with both end faces of the outer poles (3, 3'), and a signal winding (7,7') for accepting a signal current to be recorded in the tape or for taking out signal current to be reproduced from the tape, the winding being provided to surround said oblique parts (101, 101') of the soft magnetic thin film and said outer pole (3,3')together.

2. The magnetic head of claim 1, wherein the soft magnetic thin films are vapor-depositied films.

3. The magnetic head of claim 1, wherein the soft magnetic thin film is on a substrate (15, 15') of a ceramic material, and in the top plane (101, 101') extends over the surface of the outer pole (3,3').

4. The magnetic head of claim 3, the ceramic material is of a hot-pressed zinc ferrite.

5. The magnetic head of claim 1, wherein the nonmagnetic substrates (15, 15') are bonded or welded to the magnetic poles (3,3') with glass.

6. A magnetic head of claim 1, wherein each of said outer pole (3,3') has a cast glass with oblique face (23) coated with said soft magnetic thin film of oblique part (101, 101'), said edge corner of the thin film being on a edge corner of the cast glass, the soft magnetic thin films (1,1') continuously coating the surfaces of glass parts and the surfaces of the magnetic outer poles (3,3').

7. The magnetic head of claim 1, wherein the soft magnetic thin film has fine slits having right angle with the gap (4).

8. The magnetic head of claim 7, wherein the melting temperature of the glass is higher than a temperature at which the substrate should be kept during vapor-deposition of the soft magnetic thin film onto said substrate.

9. The magnetic head of claim 7 wherein the fine slits are of 20 to 200 μm pitch.

10. The magnetic head of claim 9, wherein the center core (2) is inserted between and tightly to contact oblique parts of the soft magnetic thin films.

* * * * *